Feb. 2, 1943.                    W. ERNST                      2,309,943
                         MULTIPLE CIRCUIT HEAT TRANSFER
                             Filed Aug. 2, 1940
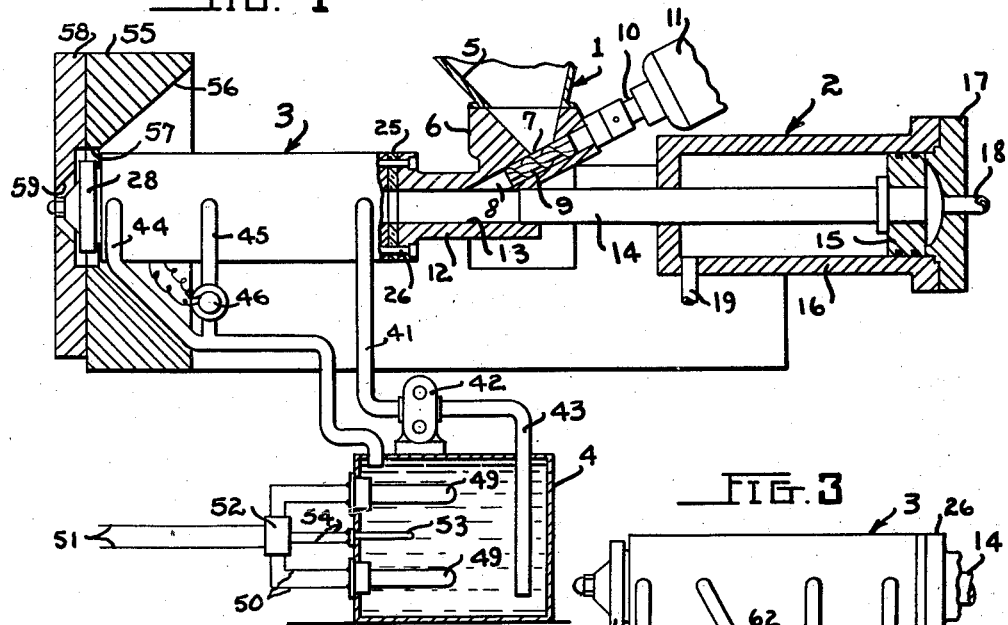
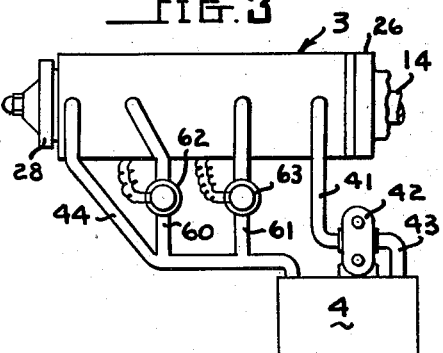
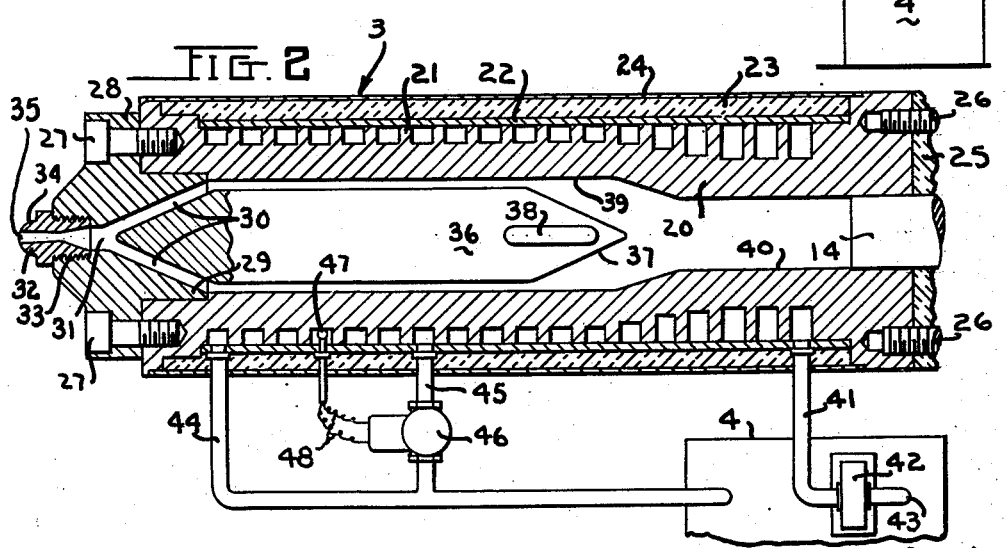
Inventor
WALTER ERNST Patented Feb. 2, 1943

2,309,943

UNITED STATES PATENT OFFICE 2,309,943

MULTIPLE CIRCUIT HEAT TRANSFER

Walter Ernst, Mount Gilead, Ohio, assignor to The Hydraulic Development Corp., Inc., Wilmington, Del., a corporation of Delaware Application August 2, 1940, Serial No. 349,969

12 Claims. (Cl. 18—30)

The present invention relates to feeding devices, and in particular to apparatus for supplying molding material to plastic extrusion or injection molding presses.

The plastic material is usually presented in granular or powder form to an oven of circular elongated configuration, the material being caused to pass from one end of the oven to the other end, from which it is ejected under pressure as a flowing readily moldable mass. It has been found that in certain kinds of plastics the time of set and character of set depend, at least to some extent, on the temperature of the plastic immediately before it enters the mold or die. In case the oven were heated by hot oil flowing through conduits surrounding the injection chamber, the temperature of the plastic was regulated by controlling the temperature of the oil. Inasmuch as the same column of oil passes through the entire length of the oven the control of the temperature obtained in this manner will necessarily affect the temperature of the oven throughout its entire length.

When certain types of plastics are employed it is often necessary to regulate the temperature at which the character of the plastic is changed from its powder or granular state to its free-flowing or plastic state, and this control of temperature should preferably be entirely independent of the temperature of the melted plastic at the time it leaves the oven. Consequently, when the temperature of the oil as a whole is changed, in order to effect a control of the temperature at the injector end of the oven, the same change in temperature is caused at the opposite end of the oven where the moldable material is being rendered plastic, and the change in temperature at the last-mentioned position may not give optimum results.

The primary object of the present invention is to provide an accurate control of the temperature of the plastic material at the point, or substantially so, where the material is actually being injected into the mold or die.

Another object is to provide a control of the character referred to, and in which such control is entirely separate and independent of the temperature control exercised at other points of the oven.

Still another object is to provide a temperature control of an oven through which heated oil is passed, and in which the control of temperature is obtained without any change in the rate of flow of the heated oil.

A more general object is to provide an elongated chamber for melting plastic material and over which the oil passes longitudinally of the chamber, together with control apparatus of a practical character by which the temperatures of the various zones of the chamber can be accurately controlled, and preferably without changing the rate of flow of the heated oil.

These objects are attained, in brief, by providing an injector chamber with a plurality of intercommunicating annular passageways through which the heated oil under pressure is caused to flow, and to by-pass from any one of the passageways or groups thereof the heated oil, thereby reducing the temperature of that portion of the injector chamber from which the oil is by-passed.

Other objects and features will be apparent as the specification is perused in connection with the accompanying drawing.

In the drawing:

Figure 1 represents a diagrammatic view, partly in section, of the improved injector oven, together with the plastic feeding mechanism, also the injection plunger and the oil tank accessory.

Figure 2 is an enlarged sectional view of the improved injector oven.

Figure 3 is a fragmentary elevational view of a modified arrangement for controlling the temperature of the oven.

Referring to the drawing in detail, Figure 1 shows a feeding device indicated generally by the reference character 1, an injector pump indicated generally at 2, the improved injector oven 3 and the oil tank 4. The feeding device comprises a conical hopper 5 containing a plastic material in granular or powder form (not shown), and which it is desired to render liquid or a free-flowing mass under pressure for injection into a mold or die (not shown). The bottom of the hopper is supported on a casting 6, which is provided with an opening 7 in alignment with the hopper, and this opening communicates with a diagonally directed opening 8 in the casting. The last-mentioned opening contains a coarse threaded feed screw 9, formed on the end of a rod 10 which is mechanically connected to a motor 11, preferably through reduction gearing.

The casting 6 is provided with a horizontally extending cylindrical portion 12 with a central bore 13, in which an injector plunger 14 is adapted to reciprocate. The remote end of this plunger carries a piston 15 which is contained within the cylinder 16 of the injector pump 2. The end of the cylinder is closed by a head 17, and the latter is provided at the center with a pipe 18 through which oil or other fluid under pressure may be admitted for moving the piston. The cylinder is provided at its opposite end with a conduit or pipe 19 through which fluid is admitted for retracting the piston, as is well known in the art.

The injector 3 is shown in detail in Figure 2. It comprises a cylinder 20 having a large diameter at one end and tapering down to a smaller diameter at the other end. There are radiating fins 21 of different lengths, depending on the relative diameters of the cylindrical portions, and engaging an outer casing 22 so as to form closed passageways between the cylinder and the casing for the circulation of a heating agent such as heated oil. For this purpose the fins 21 are arranged in a spiral manner around the cylinder 20 so as to provide a continuous passageway from one end of the cylinder to the other. There is a relatively thick layer 23 of insulating material surrounding the casing 22, and a protective metal cylinder 24 surrounding the layer 23. The right-hand end of the casing 22, the heat insulating layer 23 and the cylinder 24 are secured to stepped or shouldered portions which form an enlargement of the cylinder 20, and this enlargement is secured to the cylinder 12 through a heavy washer of heat insulating material 25 by the screws 26. The opposite ends of the casing 22, the heat insulating layer 23 and the cylinder 24 are secured to the stepped portions of an enlargement of the injection cylinder 20, and to this enlargement there is secured by the screws 27 a cap 28.

This cap is provided with an inwardly projecting portion 29 which abuts a shoulder on the cylinder 20, and is provided with a plurality of equi-distantly spaced openings 30 which extend diagonally through the cap extension. These openings all merge together to form a common central passageway 31 through which the plastic material is caused to flow on its way to the injector tip. The latter consists of a centrally bored plug member 32, threaded as at 33 into the cap 28, and terminating in a rounded portion or tip 34. The bore through the tip is preferably Venturi shaped, having a throat from which the bore is enlarged at one side into an opening in alignment with the opening 31, and at the other side the bore terminates in an orifice indicated at 35, through which the plastic material is ejected at considerable pressure into the die or mold which abuts the rounded tip portion 34. The cap 28 carries a longitudinally extending deflector or spreader 36 of circular configuration, and having a conical end indicated at 37 which is provided with four or more outwardly extending locating webs 38. The oppositely disposed webs have an overall dimension such as to fit snugly within the enlarged bore 39 of the cylinder 20, these webs serving to locate the deflector 36 centrally of the bore. The deflector has a diameter somewhat less than that of the bore 39 so as to leave an annular space between the parts, through which the plastic material is forced by the reciprocations of the injector plunger in a manner which will be described presently. The bore 39 of the injector chamber has a reduced diameter portion, indicated at 40, of a size snugly to fit the injector plunger 14.

The oil supply circuit consists of an intake pipe 41 which communicates with the right-hand ends of the annular passageways, and is taken from the discharge end of a continually operating pump 42 having an intake pipe 43. The latter is immersed in the tank 4 (Figure 1) which is preferably filled with a substantially non-compressible fluid such as oil. From the opposite end of the helical annular passageway which surrounds the cylinder 20 there is taken a conduit 44 which terminates at the tank 4, as indicated in Figure 1. There is a conduit 45 taken from a position on the annular passageway intermediate the ends of the passageway, this conduit communicating, through an electrically operated valve 46 of any suitable and well known type, with the conduit 44. This valve is preferably controlled by a thermostat 47 through the wires 48, the thermostat being placed at any suitable position within the annular passageway and between the conduits 44 and 45. The arrangement is such that when the temperature of the oil immediately surrounding the thermostat is greater than a predetermined temperature the electrical connections within the thermostat are changed to provide electrical impulses which effect corresponding changes in the valve 46. The latter may be either completely or partially closed or opened under these conditions, depending on the purpose for which the thermostat is provided.

The tank 4 may contain a number of heaters, for example, of the electrical resistance type and indicated at 49, which are energized through the conductors 50 from the mains 51. There is a controllable switch 52 interposed between the conductors 50 and 51, and this switch is controlled from a thermostat 53 positioned within the tank either through the wires 54 or by a mechanical connection (not shown), as is well understood in the art. When the temperature of the oil within the tank 4 exceeds a predetermined temperature the thermostat 53 will so affect the circuit, including the wires 54, as to open the circuit at the switch 52 or in any other manner control the current passing to the heaters 49. Thus the temperature of the oil in the tank 4 may be maintained constant at any predetermined amount for which the thermostat 53 is set.

The left-hand end of the injector 3 is supported in any suitable manner from the molding apparatus or die, but as shown, the injector is surrounded by a heavy block of metal 55, which has a tapered bore indicated at 56 emerging into a straight bore indicated at 57 which receives the cap 28 of the injector. There is a terminal plate 58 abutting the block 55, this plate having an opening 59 of conical shape through which the injector tip portion 34 extends.

*Operation*

In the operation of the device plastic material in granular or powder form is placed within the hopper 5, and assuming that the feed screw 9 is being continually rotated by the motor 11, the material is conveyed into the bore of the cylinder 12. Pressure fluid is then supplied to the conduit 18, causing the piston 15 to be moved to the left to force the charge of plastic material into the injection chamber 40, as indicated in Figure 2.

Assume now that the oil in the tank 4 has been heated to the proper temperature and is being supplied under pressure and at a constant rate by the pump 42 to the annular passageway surrounding the cylinder 20. The cylinder is therefore maintained at such an elevated temperature by the flowing oil as to render plastic the granular mass of material in the injection chamber. Succeeding reciprocations of the plunger 14 and continued rotation of the feed screw 9 will cause additional material to be supplied to the injector chamber, and this material as it is being brought to a moldable condition is first caused to spread over the conical surface 37, and then to be pushed through the annular opening around the deflector 36, and finally through the diagonal openings 30 and out through the orifice 35. This orifice communicates with an opening in a die or mold (not shown) so that plastic material in a heated and molded state is being continually ejected at the orifice to fill the mold or die.

It has been found that under these conditions the temperature of the heated plastic as it flows through the various passageways at the left of the injector, determines not only the time necessary to cause a set of the material but also the character of the set, i. e., surface hardness of the molded object, the appearance and in certain kinds of plastic the quality of the crystalline structure. It will be understood that the time of set is quite important in that it represents the time during which a particular mold or die is in use, and for that reason cannot be used for any other purpose.

It has been customary, in controlling the temperature of the plastic at the injection end of the oven, to regulate the temperature of the oil supplied from the tank 4. However, this form of regulation was not entirely satisfactory for the reason that the temperature at the right-hand end of the injector was made dependent on and regulated in the same degree as the temperature at the left-hand end, and vice versa. The temperature required in the injection chamber immediately to the left of the plunger is not only entirely different from the temperature at the ejection end of the oven, but also varies in a different manner depending on the kind of plastic. Consequently, a change in temperature of the oil does not give the desired flexibility of change in the various temperatures required throughout the length of the oven in order to produce optimum results. Moreover, in the case of injectors of considerable size which require large quantities of oil, it is not always convenient or practical to change the temperature of the oil, and certainly not in an abrupt degree as might be necessary when conditions dictate such a change.

In accordance with the present invention I provide a convenient way and apparatus for controlling the temperature throughout any portion or region of the injector oven, and substantially independent of the temperature throughout other portions or regions of the oven. This improvement is brought about by the use of the auxiliary return conduit 45 (Figure 2), which is connected to the series of passageways intermediate the ends of the combined passageway. It is apparent that as the temperature of the cylinder 20 becomes higher than a predetermined temperature, or rather that portion of the cylinder between the conduit 45 and the left-hand end of the combined passageway, the thermostat 47 will respond to this excessive temperature to open the valve 46 in a degree depending on the amount of excessive temperature. Thus greater amounts of heated oil are shunted or by-passed from the passageways at the conduit 45, depending on the temperature of that portion of the cylinder 20 to which the thermostat 47 responds. The friction offered to the fluid passing through the annular passageways may be so great that when the valve 46 is completely opened, most if not all of the heated fluid will return to the pump 42 through the conduit 45, so that the left-hand end of the cylinder will be heated mainly by conduction and to some extent by radiation from the right-hand end of the cylinder.

The valve 46 and its temperature-responsive control device 47 are usually set in such a way that the return of the heated fluid is divided between the two left-hand conduits, and the portions of the combined flow of the fluid through either conduit are determined by the temperature conditions required at the left-hand end of the injector in order to control the time of setting and the condition of the set of the plastic material ejected at the orifice 35. It is apparent that the opening and closing of the valve 46 have little if any effect on the temperature of the oil passing through the passageways to the right of the conduit 45, so that by the use of the by-pass conduit it is possible to control the temperatures of the various portions of the injector chamber more or less independently of one another and thus obtain the optimum conditions at each portion of the injection chamber in terms of the plastic condition of the moldable material.

It will be further noted that the flow of the heated oil through the pump 42 is not materially affected by the momentary condition of the valve 46, so that it is entirely feasible to have the pump 42 maintain a substantially constant fluid pressure and delivery. The control of the individual temperatures along the length of the injection chamber can be rapidly effected by the use of the auxiliary return conduit 45 since it is a matter of by-passing the heated fluid rather than having to change the temperature of the large body of fluid contained within the tank 4. However, it will be understood that the temperature of the oil is maintained relatively constant and therefore changed when necessary by the operation of the thermostat 53, through the switch 52 which controls the supply of current to the heaters 49. In accordance with my invention it is no longer necessary, in case the left-hand end of the injector chamber is at a temperature higher than a predetermined temperature, to either cool the large body of oil contained within the tank 4 in any suitable and well known manner or to wait even longer periods of time for this oil to cool by ordinary convection and radiation.

In case it is desired to subdivide the injector chamber into a considerable number of temperature zones, all more or less independently controlled, a larger number of return conduits may be employed. This modification is shown in Figure 3, which provides two auxiliary return conduits 60, 61, each of which has its own control valve, indicated at 62, 63 respectively, and its own thermostat (not shown) which may be placed at any desired position along the length of the combined fluid passageway.

It will be understood that I desire to comprehend within my invention such modifications as come within the scope of the claims and the invention.

Having thus fully described my invention, what I claim as new and desire to secure by Letters Patent is:

1. In combination, an injector chamber, an injector plunger reciprocable therein, an operating member for reciprocating said plunger, a plurality of passageways connected in series and in heat-transfer relation with respect to the chamber, said passageways being adapted to receive a heated fluid, means for forcing the fluid through the passageways, and means for reducing the flow of the heated fluid through any predetermined number of passageways while maintaining a substantially constant flow of fluid through the remaining passageways, whereby the heating of the chamber is controlled.

2. In combination, an injector chamber, an injector plunger reciprocable therein, an operating member for reciprocating said plunger, a plurality of passageways connected in series and in heat-transfer relation with respect to the chamber, said passageways being adapted to receive a heated fluid, means for forcing the fluid through the passageways, and means for reducing the flow of the heated fluid through any predetermined number of passageways while maintaining a substantially constant flow of fluid through the remaining passageways, whereby the heating of the chamber is controlled, said last-mentioned means comprising a fluid return conduit connected to the combined passageway intermediate the ends thereof.

3. In combination, an injector chamber, an injector plunger reciprocable therein, an operating member for reciprocating said plunger, a passageway in heat-transfer relation with respect to the chamber for receiving heated oil, a pump for forcing the oil through the passage, means for reducing the flow of the heated oil through any portion of the passageway while maintaining a substantially constant flow of oil through the remaining portion of the passageway, whereby the heating of the chamber is controlled, said last-mentioned means comprising a conduit connected between the return side of the pump and the passageway intermediate the ends thereof, and a valve in said conduit.

4. In combination, an injector chamber, an injector plunger reciprocable therein, an operating member for reciprocating said plunger, a passageway in heat-transfer relation with respect to the chamber for receiving heated oil, a pump for forcing the oil through the passageway, means for reducing the flow of the heated oil through any portion of the passageway while maintaining a substantially constant flow of oil through the remaining portion of the passageway, and temperature-responsive means in said chamber for regulating the valve in order to maintain the parts of the chamber respectively at predetermined temperatures.

5. In combination, an injector chamber, an injector plunger reciprocable therein, an operating member for reciprocating said plunger, passageways in heat-transferring relation to the chamber for receiving heated oil, means for forcing the oil through the passageways, and means for varying the effective length of the passageways while maintaining a relatively constant flow of oil, whereby the heating of the chamber is controlled.

6. In combination, an injector chamber, an injector plunger reciprocable therein, an operating member for reciprocating said plunger, a plurality of passageways serially connected and surrounding said chamber for receiving heated oil, a pump for forcing the oil through the combined passageway, and means for varying the effective length of the combined passageway in order to control the heating of said chamber.

7. In combination, an injector chamber, an injector plunger reciprocable therein, an operating member for reciprocating said plunger, passageways in heat-transfer relation with respect to the chamber and adapted to receive heated oil, a pump for forcing the oil through the passageways, means for controlling the heat transferred from the passageways to the chamber by the oil while maintaining a relatively constant flow of oil through the pump, and means for maintaining the oil at a predetermined temperature.

8. In combination, an injector chamber, an injector plunger reciprocable therein, an operating member for reciprocating said plunger, a plurality of passageways connected in series and in heat-transfer relation with respect to the chamber, said passageways being adapted to receive a heated fluid, means for forcing the fluid through the passageways, means for reducing the flow of the heated fluid through any predetermined number of passageways while maintaining a substantially constant flow of fluid through the remaining passageways, said last-mentioned means comprising a plurality of oil return conduits connected at different points on the combined passageway other than at the ends thereof, valves connected in the respective conduits, and temperature-responsive means positioned at various points throughout said chamber and adapted respectively to control the closing of the valves for maintaining the portions of the chamber at predetermined temperatures.

9. In combination, a chamber for receiving material to be heated, means for heating and controlling the temperature in the different sections of the chamber, said means including a jacket for circulating heated fluid throughout the chamber, by-pass fluid conduits taken from different positions along the jacket, and means for opening and closing the respective by-pass conduits in accordance with the temperature acquired by the section of the chamber immediately adjacent each by-pass conduit.

10. In combination, a chamber for receiving material to be heated, means for heating and controlling the temperature throughout the different sections of the chamber, said means comprising a jacket adapted to receive a heating fluid, and provided with a structure for short circuiting portions of the jacket to by-pass the fluid from said jacket portions when the temperature of the jacket over the short circuiting portions is to be reduced.

11. In combination, a chamber for receiving material to be heated, means including a closed circulatory fluid system for heating and controlling the temperature in the different sections of the chamber, said means also including a jacket for circulating the heated fluid through the chamber, by-pass conduits taken from a different position along the jacket and communicating with the closed circulatory fluid system, and means for opening and closing the respective by-pass conduits in accordance with the temperature acquired by the section of the chamber immediately adjacent each by-pass conduit, said means comprising thermostats responsive to the temperature of the respective chamber sections.

12. In combination, a chamber for receiving material to be heated, means including a constant delivery fluid pump for heating and controlling the temperature in the different sections of the chamber, said means also including a jacket for circulating the heated fluid throughout the chamber, by-pass fluid conduits taken from the different positions along the jacket and communicating with said pump, and means for opening and closing the respective conduits in accordance with the temperature acquired by the section of the chamber immediately adjacent each by-pass conduit.

WALTER ERNST.